US012034239B2

(12) United States Patent
Komoto et al.

(10) Patent No.: US 12,034,239 B2

(45) Date of Patent: Jul. 9, 2024

(54) CONNECTOR

(71) Applicant: JAPAN AVIATION ELECTRONICS INDUSTRY, LIMITED, Tokyo (JP)

(72) Inventors: Tetsuya Komoto, Tokyo (JP); Akira Kimura, Tokyo (JP); Keisuke Nakamura, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 360 days.

(21) Appl. No.: 17/666,631

(22) Filed: Feb. 8, 2022

(65) Prior Publication Data

US 2022/0320770 A1 Oct. 6, 2022

(30) Foreign Application Priority Data

Apr. 1, 2021 (JP) ................................ 2021-063098

(51) Int. Cl.

| | |
|---|---|
| ***H01R 12/00*** | (2006.01) |
| ***H01R 12/71*** | (2011.01) |
| ***H01R 13/502*** | (2006.01) |
| ***H01R 13/631*** | (2006.01) |

(52) U.S. Cl.

CPC ......... *H01R 12/716* (2013.01); *H01R 13/502* (2013.01); *H01R 13/6315* (2013.01)

(58) Field of Classification Search

CPC . H01R 12/716; H01R 13/502; H01R 13/6315

See application file for complete search history.

(56) References Cited

U.S. PATENT DOCUMENTS

| | | | | |
|---|---|---|---|---|
| 10,516,228 | B2 | 12/2019 | Takenaga et al. | |
| 11,563,284 | B2 * | 1/2023 | Oosaka | H01R 13/6271 |
| 11,916,323 | B2 * | 2/2024 | Maeda | H05K 1/0225 |
| 2004/0063344 | A1 * | 4/2004 | Shin | H01R 13/26 439/74 |
| 2022/0320770 | A1 * | 10/2022 | Komoto | H01R 12/716 |
| 2023/0198179 | A1 * | 6/2023 | Ashibu | H01R 12/55 439/74 |

FOREIGN PATENT DOCUMENTS

| | | | |
|---|---|---|---|
| JP | 2003017162 | A | 1/2003 |
| JP | 2019046670 | A | 3/2019 |
| WO | 02054540 | A1 | 7/2002 |

OTHER PUBLICATIONS

Extended European Search Report (EESR) dated Jul. 19, 2022, issued in counterpart European Application No. 22156459.4.

* cited by examiner

*Primary Examiner* — Phuong Chi Thi Nguyen

(74) *Attorney, Agent, or Firm* — Holtz, Holtz & Volek PC

(57) ABSTRACT

A connector is mounted on a circuit board when used. The connector has a housing and a terminal which has a held portion, a supporting portion, a coupling portion, a contact portion and a guiding portion. The coupling portion has a fulcrum. The guiding portion receives a vertical force from a mating terminal at a specific contact location. The guiding portion receives, at the specific contact location, a frictional force caused by friction between the mating terminal and the guiding portion upon movement of the mating terminal on the guiding portion. An action line of a combined force of the vertical force and the frictional force intersects with one of the circuit board and the housing at a reference point. The fulcrum is positioned beyond the reference point in a first orientation of a first horizontal direction.

8 Claims, 10 Drawing Sheets

CONNECTOR

CROSS REFERENCE TO RELATED APPLICATIONS

This application is based on and claims priority under 35 U.S.C. § 119 to Japanese Patent Application No. JP2021-063098 filed Apr. 1, 2021, the contents of which are incorporated herein in their entirety by reference.

BACKGROUND OF THE INVENTION

This invention relates to a connector which is mounted on a circuit board when used.

Referring to FIGS. 19 and 20, JPA2003-17162 (Patent Document 1) discloses a connector 900 which is mounted on an FPC 980 when used. The connector 900 is mateable along a Z-direction with a mating connector 950 which has mating terminals 952. The connector 900 comprises terminals 910 and a housing 920. Each of the terminals 910 has a held portion 912, a supporting portion 916, a coupling portion 914, a contact portion 917 and a guiding portion 918. The held portion 912 is held by the housing 920. The supporting portion 916 has a resilient property. The coupling portion 914 couples the held portion 912 and the supporting portion 916 with each other. The contact portion 917 is supported by the supporting portion 916 and faces inward in an X-direction. The guiding portion 918 is positioned beyond the contact portion 917 in a positive Z-direction and extends outward in the X-direction and in the positive Z-direction.

If the connector of Patent Document 1 is mounted on a rigid circuit board such as a printed circuit board, the connector 900 has a drawback as follows: when the connector 900 and the mating connector 950 are mated with each other, a contact pressure between the mating terminal 952 and the terminal 910 might be increased and thereby the supporting portion 914 of the terminal 910 might be buckled.

SUMMARY OF THE INVENTION

It is therefore an object of the present invention to provide a connector which prevents buckling of a terminal when the connector is mated with a mating connector.

One aspect of the present invention provides a connector which is mounted on a circuit board when used. The connector is mateable along an up-down direction with a mating connector which has a mating terminal. The connector has a housing and a terminal. The terminal has a held portion, a supporting portion, a coupling portion, a contact portion and a guiding portion. The held portion is held by the housing. The supporting portion has a resilient property. The coupling portion couples the held portion and the supporting portion with each other. The coupling portion has a fulcrum. The contact portion is supported by the supporting portion and faces in a first orientation of a first horizontal direction which is perpendicular to the up-down direction. The first orientation starting from the contact portion is away from the held portion. The guiding portion is positioned above the contact portion in the up-down direction. The guiding portion extends in a second orientation of the first horizontal direction and upward in the up-down direction. The second orientation is opposite to the first orientation. In a middle of a process of mating the mating connector and the connector with each other, the mating terminal is moved on the guiding portion while the mating terminal pushes down a whole of the terminal and the fulcrum begins to be pressed against one of the circuit board and the housing. The mating terminal and the guiding portion are brought into contact with each other at a specific contact location at the beginning of the fulcrum being pressed against the one of the circuit board and the housing. The guiding portion receives a vertical force from the mating terminal at the specific contact location. The vertical force is directed perpendicular to a contact surface where the mating terminal and the guiding portion are in contact with each other at the specific contact location. The guiding portion receives, at the specific contact location, a frictional force caused by friction between the mating terminal and the guiding portion upon movement of the mating terminal on the guiding portion. An action line of a combined force of the vertical force and the frictional force intersects with the one of the circuit board and the housing at a reference point. The fulcrum is positioned beyond the reference point in the first orientation of the first horizontal direction.

As understood from FIGS. 19 and 20, the contact portion 917 in an initial state is moved toward the outside of the connector 900 in the X-direction when the connector 900 is mated with the mating connector 950. When the mating terminal 952 pushes the guiding portion 918 in a negative Z-direction in a middle of a mating process where the connector 900, which is mounted on a rigid circuit board, is mated with the mating connector 950, the coupling portion 914 abuts against a part of the circuit board and thereby the supporting portion 916 is resiliently deformed about the part of the circuit board acting as a fulcrum. At this time, a moment directed toward the inside of the connector 900 in the X-direction is produced on the contact portion 917. Specifically, the connector 900 of Patent Document 1 has a drawback that the orientation, in which the contact portion 917 in the initial state should be moved, is opposite to the orientation of the moment which is produced on the contact portion 917 when the connector 900 and the mating connector 950 are mated with each other.

In contrast, the connector of the present invention is configured as follows: the contact portion is supported by the supporting portion having the resilient property; the contact portion faces in the first orientation of the first horizontal direction which is perpendicular to the up-down direction; and the first orientation starting from the contact portion is away from the held portion. In other words, the connector of the present invention is configured so that an orientation, in which the contact portion in an initial state should be moved, is the second orientation which is opposite to the first orientation. Additionally, the connector of the present invention is configured so that the fulcrum is positioned beyond the reference point in the first orientation of the first horizontal direction. Thus, the connector of the present invention is configured so that a moment with respect to the fulcrum, which is produced at the specific contact location, is directed not in the first orientation, but in the second orientation. Summarizing the above, the connector of the present invention is configured so that the orientation, in which the contact portion in the initial state should be moved, coincides with the orientation of the moment with respect to the fulcrum at the specific contact location. Thus, when the connector and the mating connector are mated with each other, the connector of the present invention prevents an increase of a contact pressure between the mating terminal and the terminal and thereby prevents buckling of the terminal.

An appreciation of the objectives of the present invention and a more complete understanding of its structure may be had by studying the following description of the preferred embodiment and by referring to the accompanying drawings.

Figure 1:
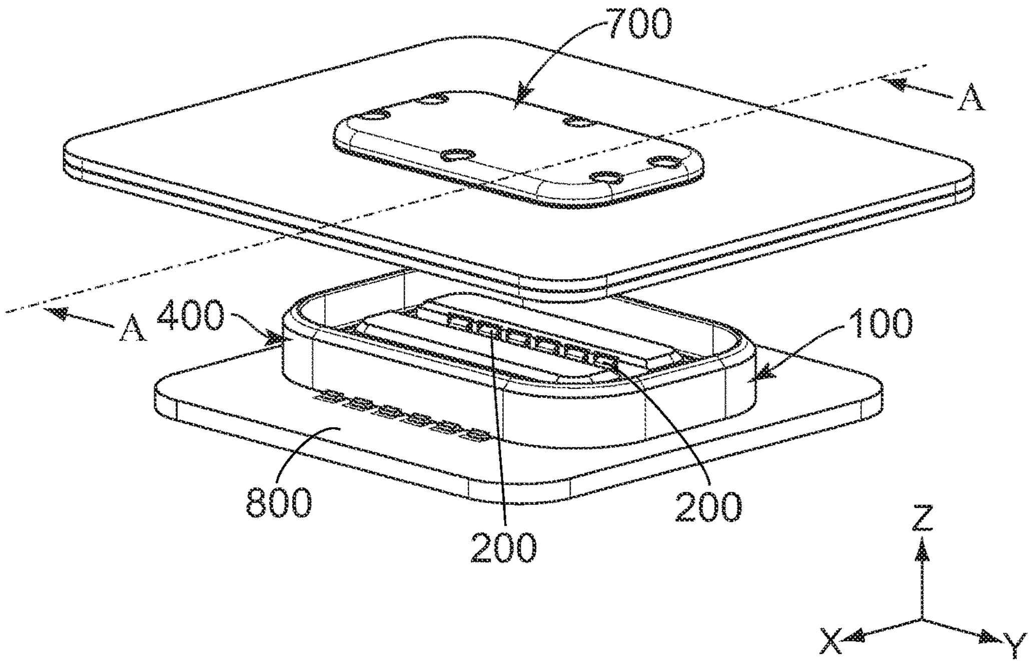
FIG. 1 is a perspective view showing a connector assembly according to an embodiment of the present invention. In the figure, a connector and a mating connector are in an unmated state where the connector and the mating connector are not mated with each other.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Referring to FIG. 1, a connector 100 according to an embodiment of the present invention is mounted on a circuit board 800 when used. The connector 100 is mateable with a mating connector 700 along an up-down direction. In the present embodiment, the up-down direction is a Z-direction. Specifically, it is assumed that upward is a positive Z-direction while downward is a negative Z-direction.

Figure 2:
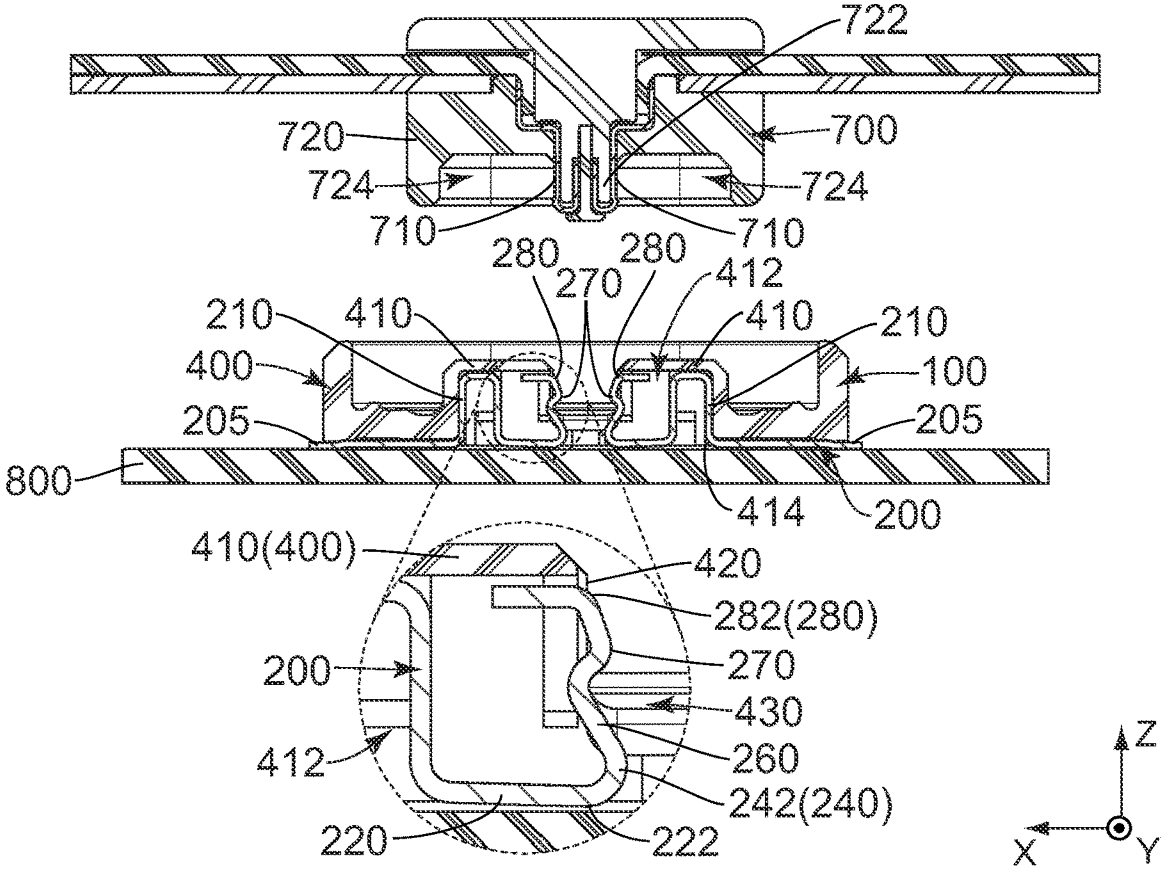
FIG. 2 is a cross-sectional view showing the connector assembly of FIG. 1, taken along line A-A.
Figure 3:
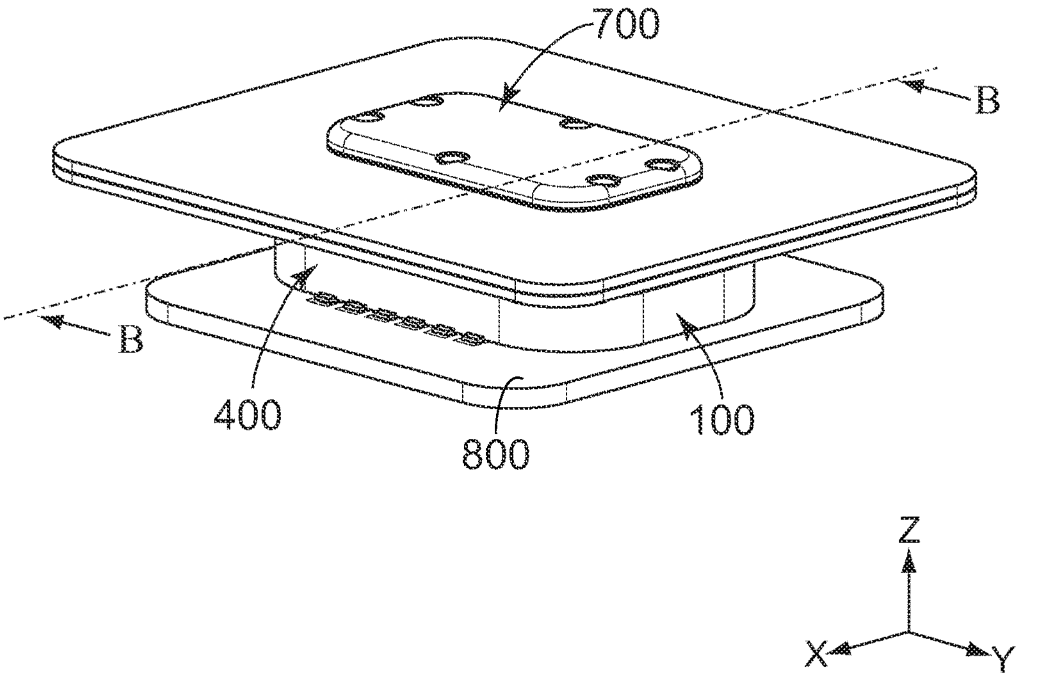
FIG. 3 is another perspective view showing the connector assembly of FIG. 1. In the figure, the connector and the mating connector is in a specific contact state.
Figure 4:
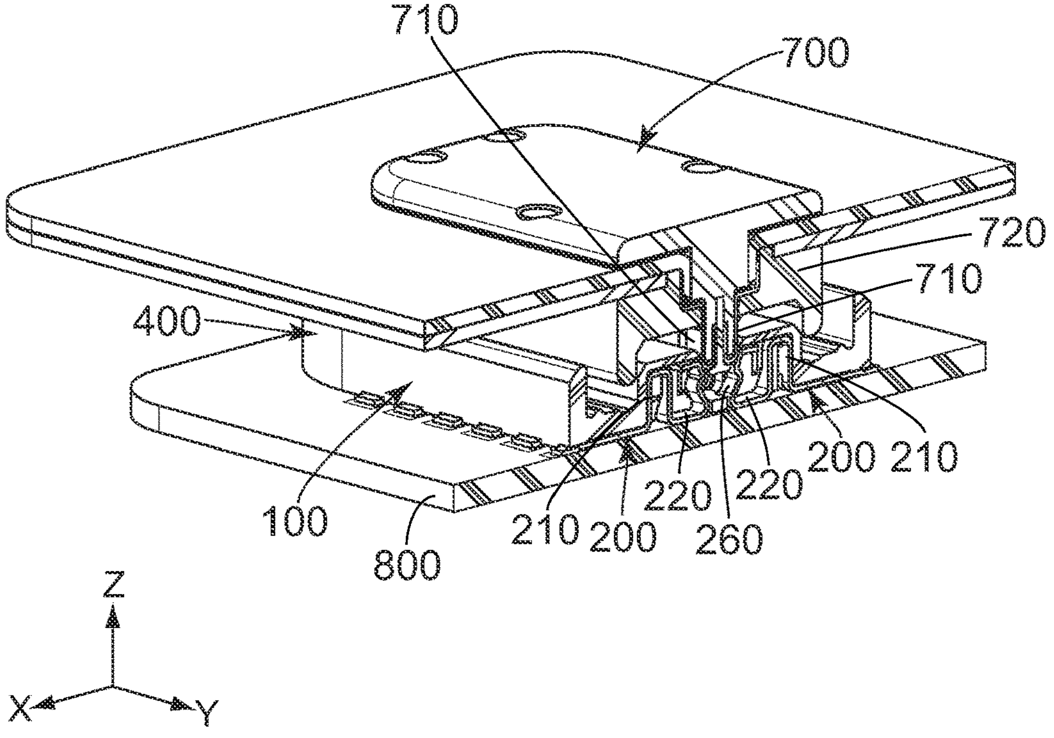
FIG. 4 is a perspective, cross-sectional view showing the connector assembly of FIG. 3, taken along line B-B.

As shown in FIG. 2, the mating connector 700 of the present embodiment has a mating housing 720 and a plurality of mating terminals 710. The mating connector 700 may, however, have a single mating terminal 710. In other words, the number of the mating terminal 710 may be one.

As shown in FIG. 2, the mating housing 720 of the present embodiment has protrusions 722 and two island-like portion accommodating portions 724.

As shown in FIG. 2, each of the protrusions 722 of the present embodiment protrudes downward in the up-down direction.

As shown in FIG. 2, the island-like portion accommodating portions 724 of the present embodiment correspond to the protrusions 722, respectively, and each of the island-like portion accommodating portions 724 is positioned outward beyond the corresponding protrusion 722 in a first horizontal direction. In the present embodiment, the first horizontal direction is an X-direction. Additionally, the first horizontal direction is also referred to as a front-rear direction. Specifically, it is assumed that forward is a positive X-direction while rearward is a negative X-direction.

Referring to FIG. 2, each of the mating terminals 710 of the present embodiment is made of metal. The mating terminals 710 are held by the mating housing 720. The mating terminals 710 are arranged in two rows in the first horizontal direction. The mating terminals 710 of each row are arranged in a second horizontal direction. In the present embodiment, the second horizontal direction is a Y-direction. A part of each of the mating terminals 710 is exposed to the outside of the protrusion 722.

Figure 10:
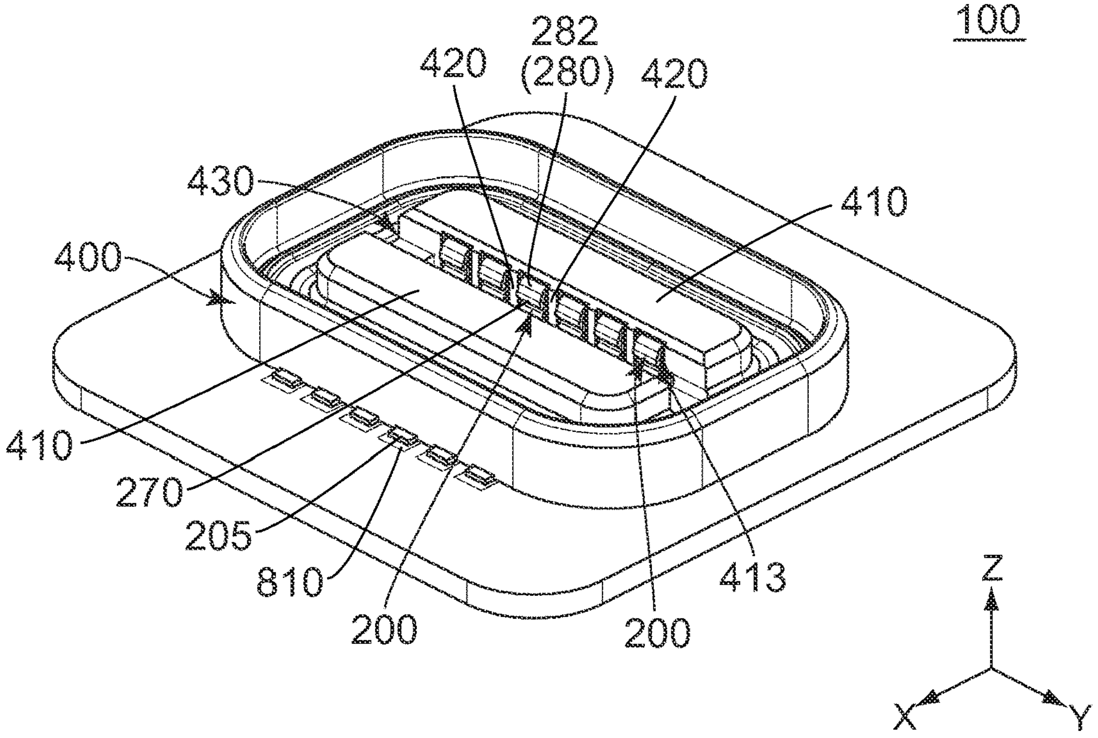
FIG. 10 is a perspective view showing the connector of FIG. 9.

As shown FIG. 10, the connector 100 of the present embodiment comprises a housing 400 and a plurality of terminals 200. The connector 100 may, however, comprise a single terminal 200. In other words, the number of the terminal 200 may be one.

Figure 9:
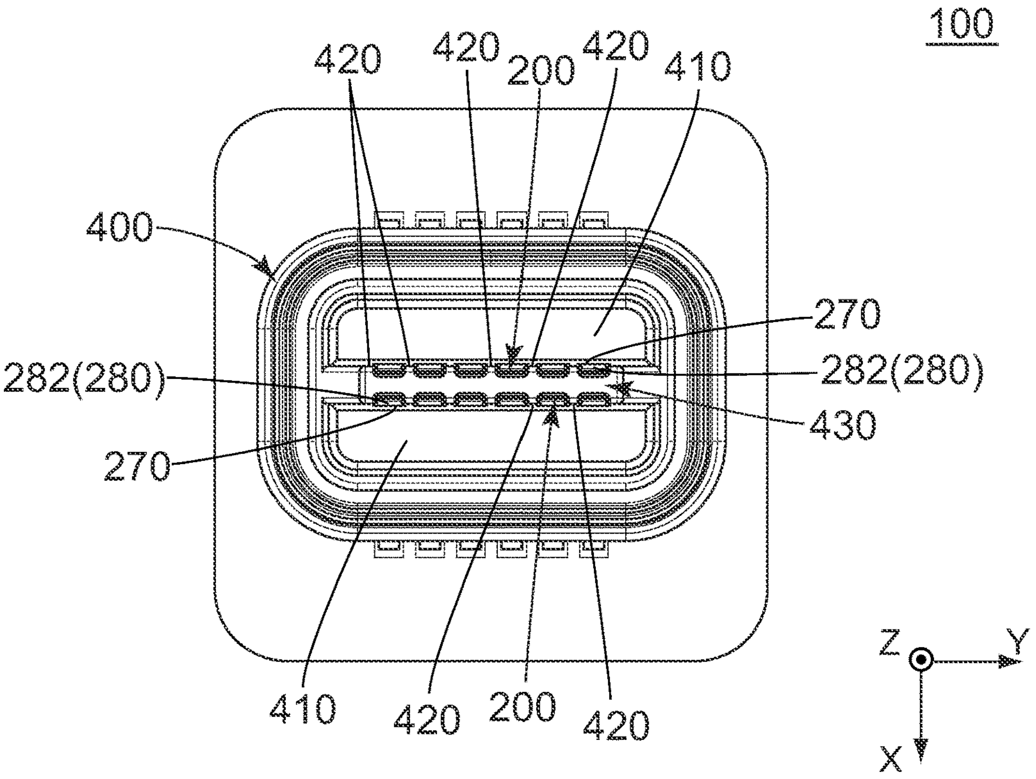
FIG. 9 is a top view showing the connector which is included in the connector assembly of FIG. 1.

Referring to FIG. 9, the housing 400 of the present embodiment is made of insulator. The housing 400 has two island-like portions 410 and a protrusion accommodating portion 430.

Figure 8:
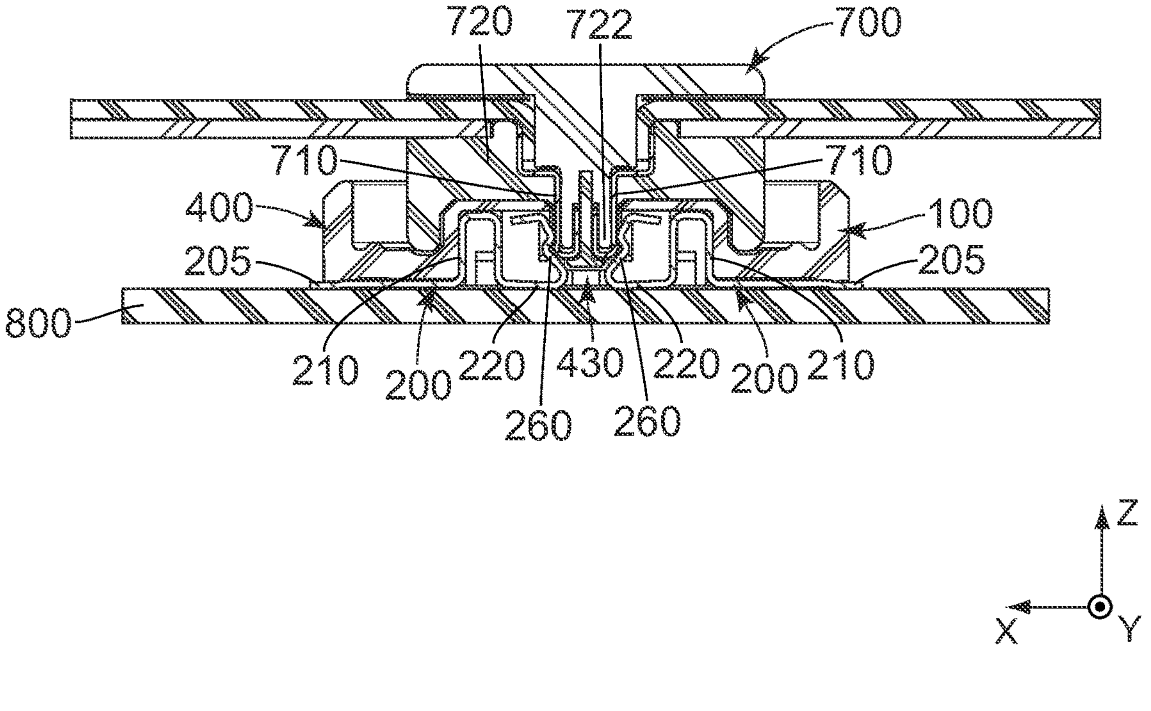
FIG. 8 is a cross-sectional view showing the connector assembly of FIG. 7, taken along line D-D.
Figure 11:
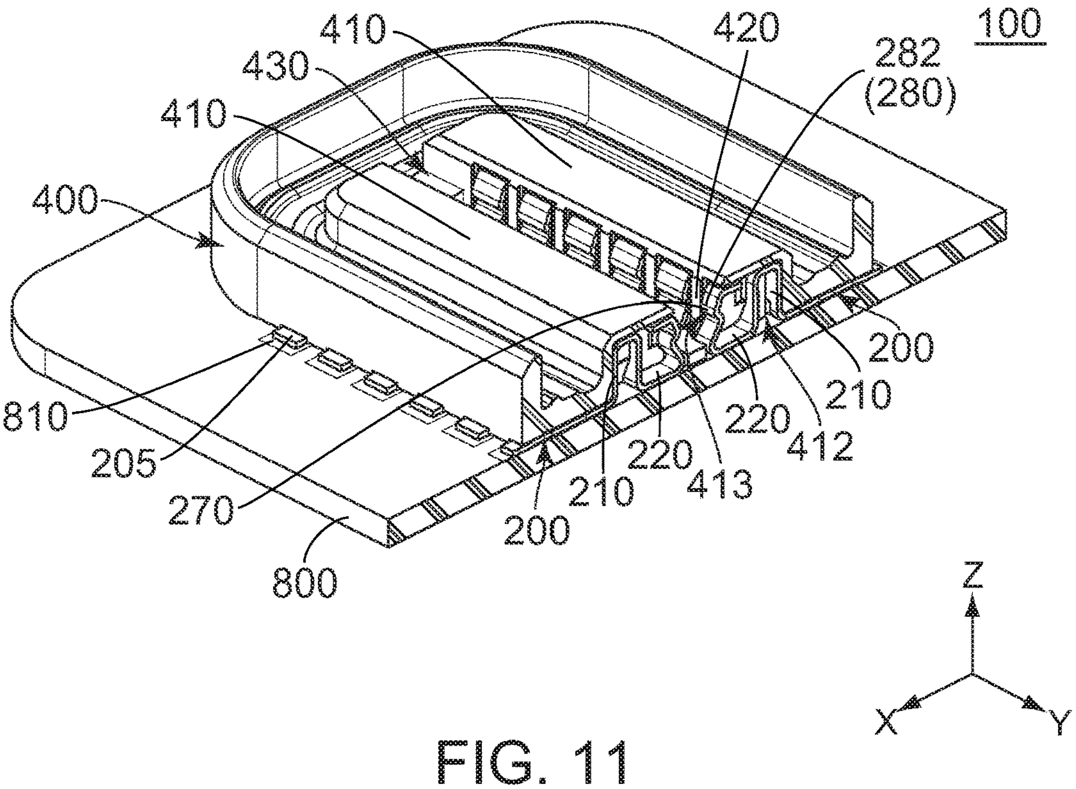
FIG. 11 is a perspective, cross-sectional view showing the connector which is included in the connector assembly of FIG. 4.

As shown in FIG. 2, each of the island-like portions 410 of the present embodiment protrudes upward in the up-down direction. Referring to FIGS. 2 and 8, the island-like portions 410 are accommodated in the island-like portion accommodating portions 724, respectively, of the mating connector 700 when the connector 100 and the mating connector 700 are mated with each other. As shown in FIG. 11, each of the island-like portions 410 has a plurality of terminal accommodating portions 412 and a plurality of connection guiding surfaces 420. In other words, the housing 400 has the connection guiding surfaces 420. However, the present invention is not limited thereto. Specifically, the number of connection guiding surfaces 420 may be two. In other words, the housing 400 should have two of the connection guiding surfaces 420.

As shown in FIG. 2, each of the terminal accommodating portions 412 of the present embodiment is opened downward in the up-down direction. As shown in FIG. 11, each of the terminal accommodating portions 412 is opened inward in the first horizontal direction. Specifically, each of the terminal accommodating portions 412 has an opening 413 at its inner end in the first horizontal direction. Each of the terminal accommodating portions 412 communicates with the protrusion accommodating portion 430 through the opening 413 in the first horizontal direction. As shown in FIG. 2, each of the terminal accommodating portions 412 has a holding portion 414. In other words, the housing 400 has the holding portions 414.

Referring to FIG. 2, each of the holding portions 414 of the present embodiment is a set of ditches which are positioned at opposite ends, respectively, of the terminal accommodating portion 412 in the second horizontal direction.

As shown in FIG. 10, each of the connection guiding surfaces 420 of the present embodiment extends in a plane which is defined by the up-down direction and the second horizontal direction. Each of the connection guiding surfaces 420 is perpendicular to the first horizontal direction. Two of the connection guiding surfaces 420 are positioned at opposite sides, respectively, of the opening 413 in the second horizontal direction.

As shown in FIG. 2, the protrusion accommodating portion 430 of the present embodiment is positioned between the two island-like portions 410 in the first horizontal direction. As shown in FIG. 8, the protrusion accommodating portion 430 accommodates the protrusions 722 of the mating connector 700 when the connector 100 and the mating connector 700 are mated with each other.

Referring to FIG. 11, the terminals 200 of the present embodiment is made of metal. The terminals 200 are held by the housing 400. The terminals 200 are arranged in two rows, namely, a front row and a rear row, in the first horizontal direction. The terminals 200 of each row are arranged in the second horizontal direction.

Figure 13:
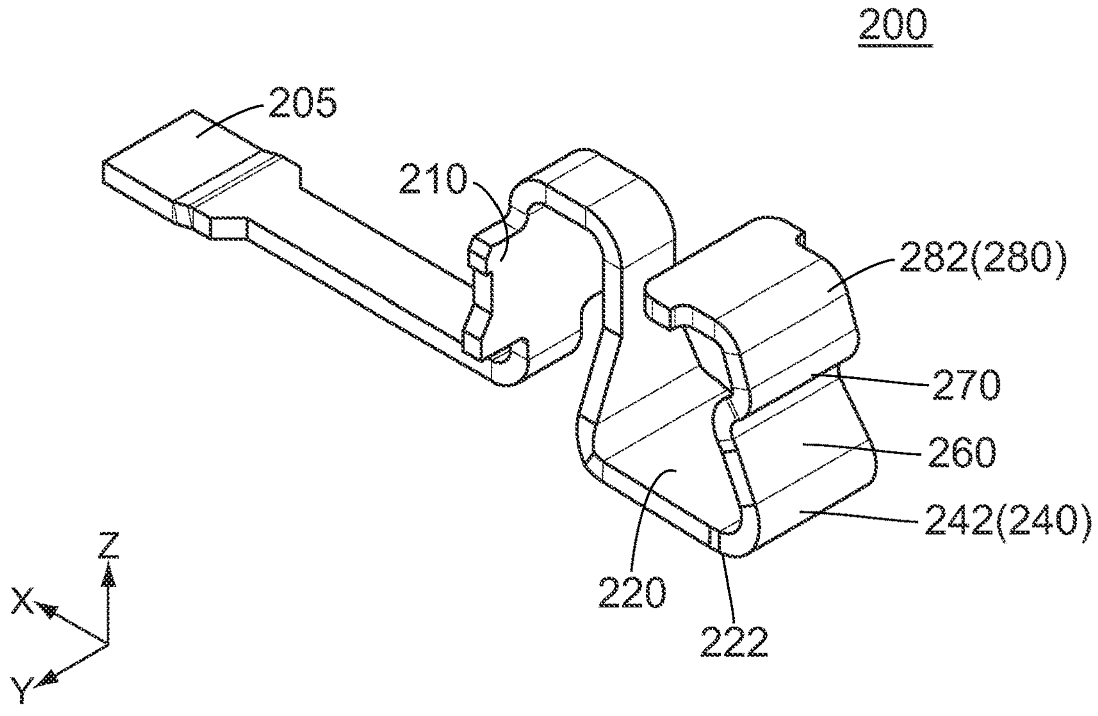
FIG. 13 is a perspective view showing the terminal of a front row which is included in the connector of FIG. 9.

As shown in FIG. 13, each of the terminals 200 has a held portion 210, a supporting portion 260, a coupling portion 220, a contact portion 270, a guiding portion 280 and a fixed portion 205.

Figure 14:
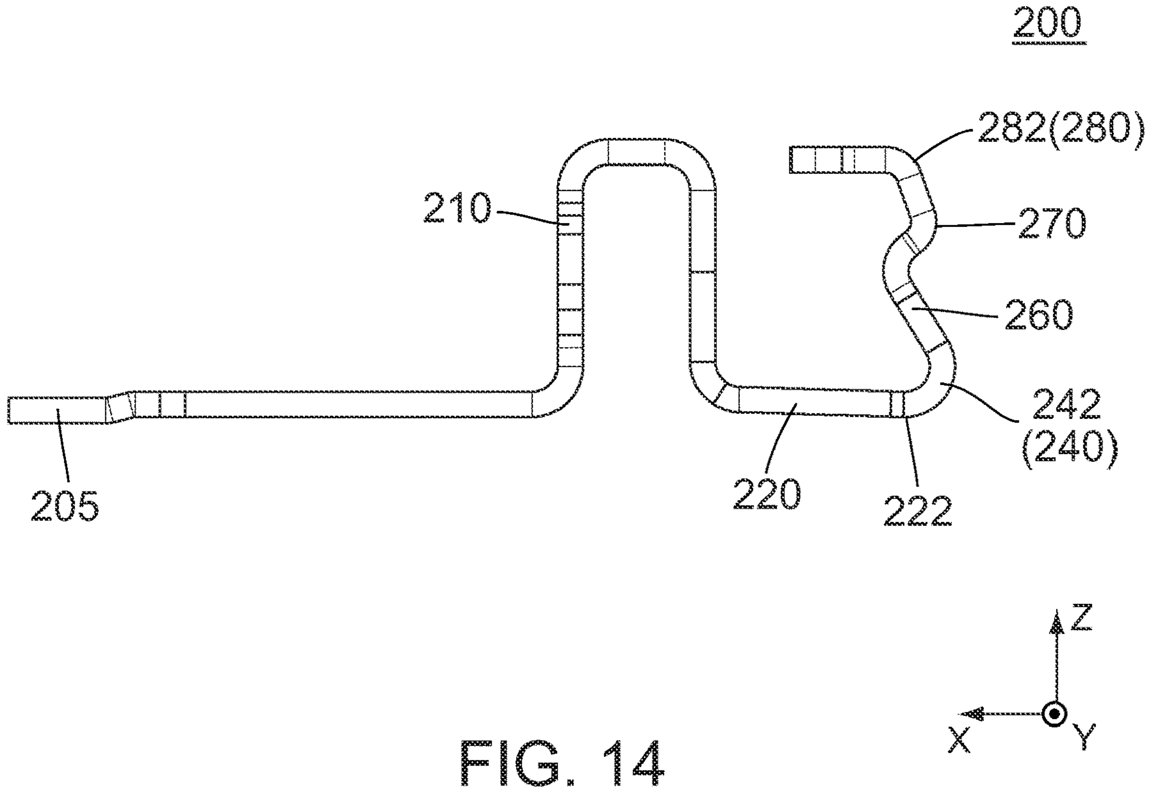
FIG. 14 is a side view showing the terminal of FIG. 13.
Figure 15:
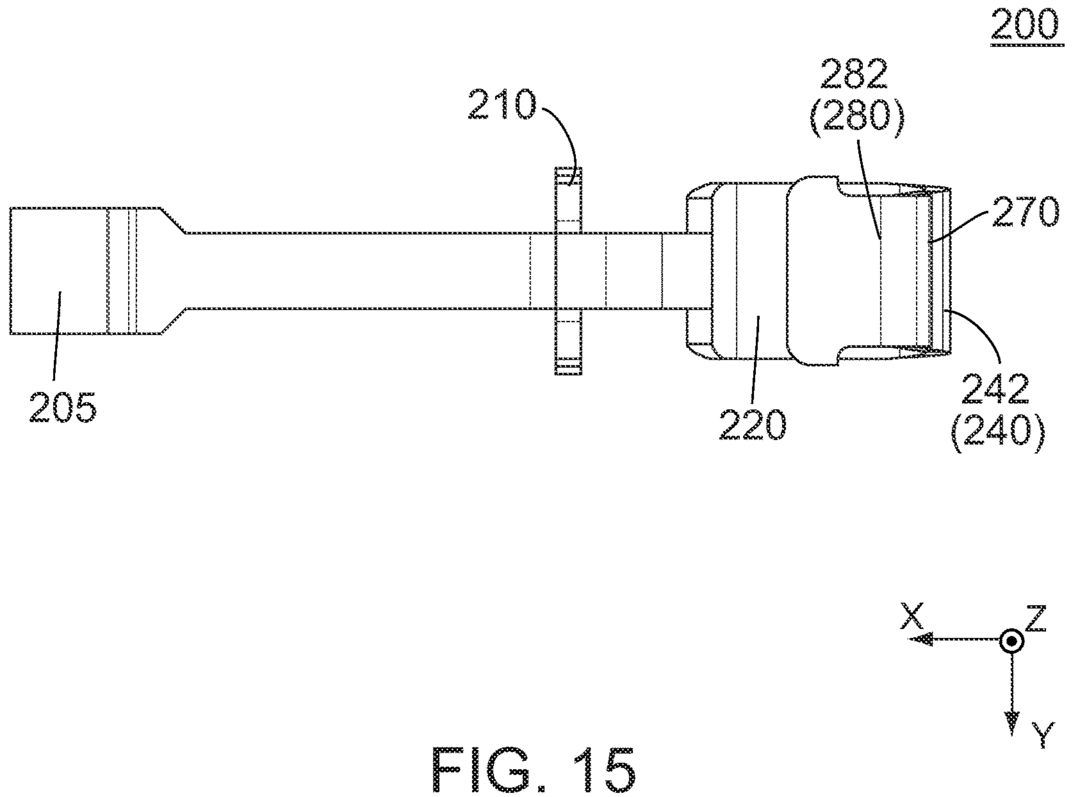
FIG. 15 is a top view showing the terminal of FIG. 13.
Figure 16:
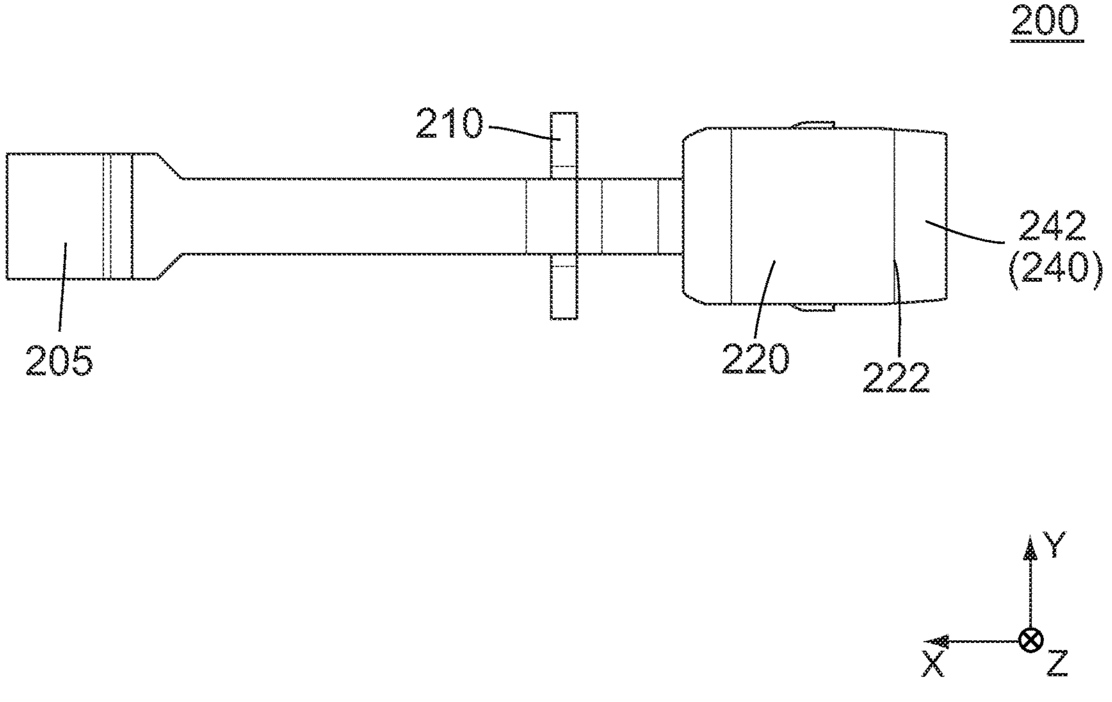
FIG. 16 is a bottom view showing the terminal of FIG. 13.
Figure 17:
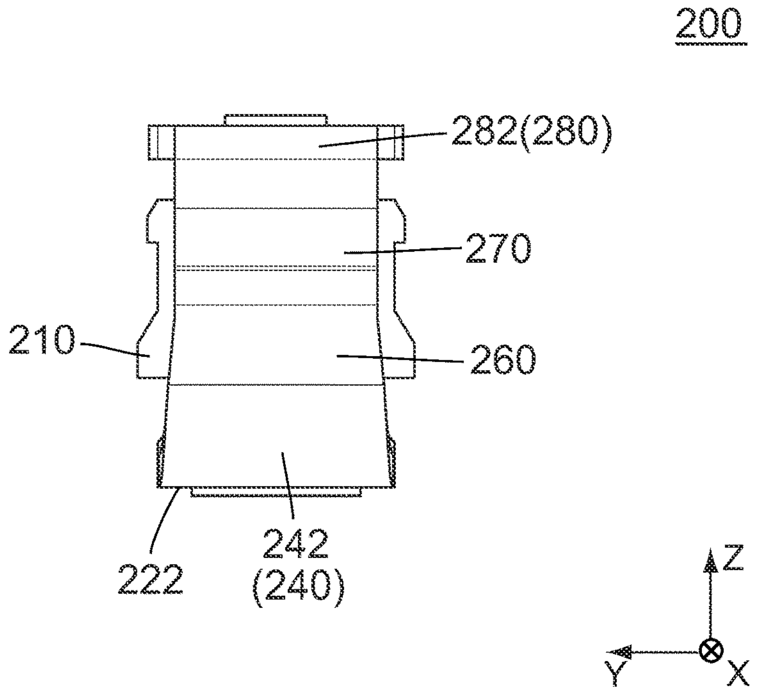
FIG. 17 is a front view showing the terminal of FIG. 13.
Figure 18:
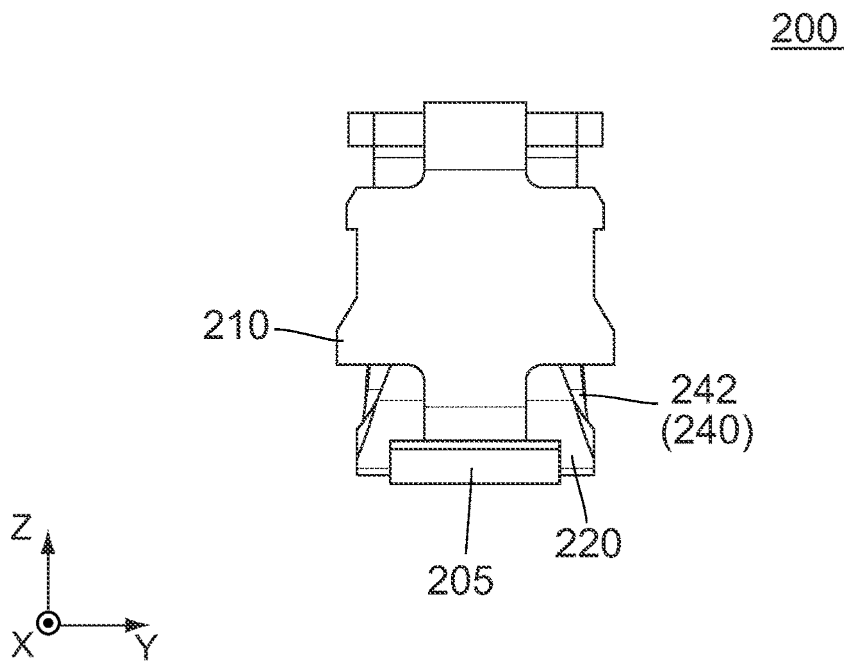
FIG. 18 is a rear view showing the terminal of FIG. 13.
Figure 19:
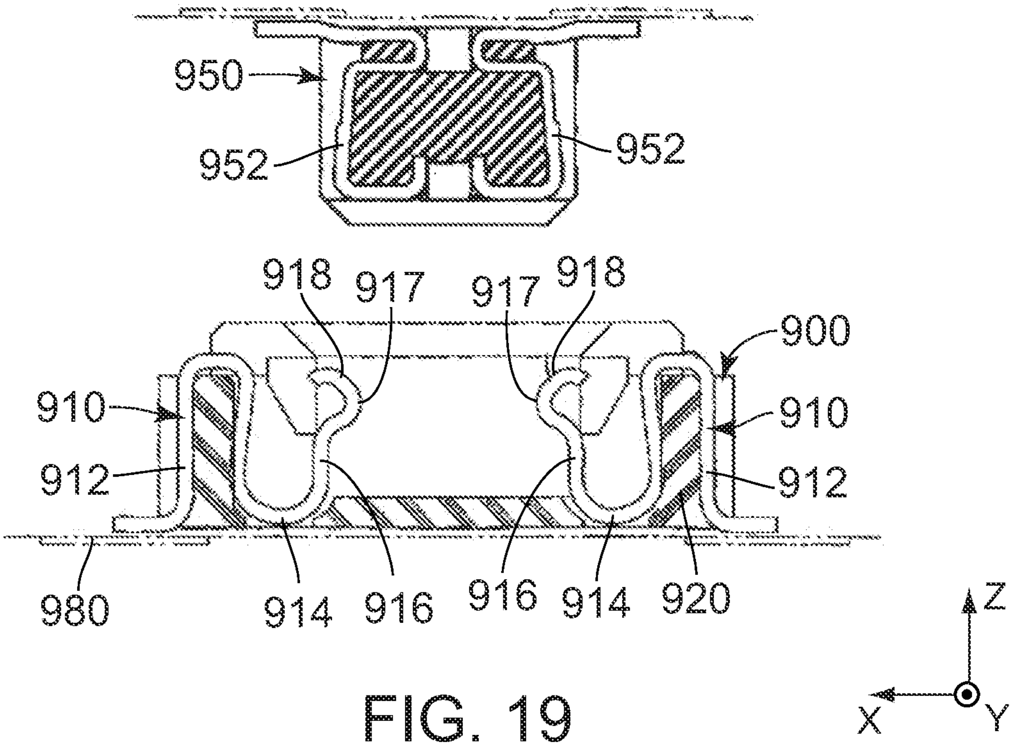
FIG. 19 PRIOR ART
FIG. 19 is a cross-sectional view showing a connector and a mating connector of Patent Document 1. In the figure, the connector and the mating connector are in an unmated state.
Figure 20:
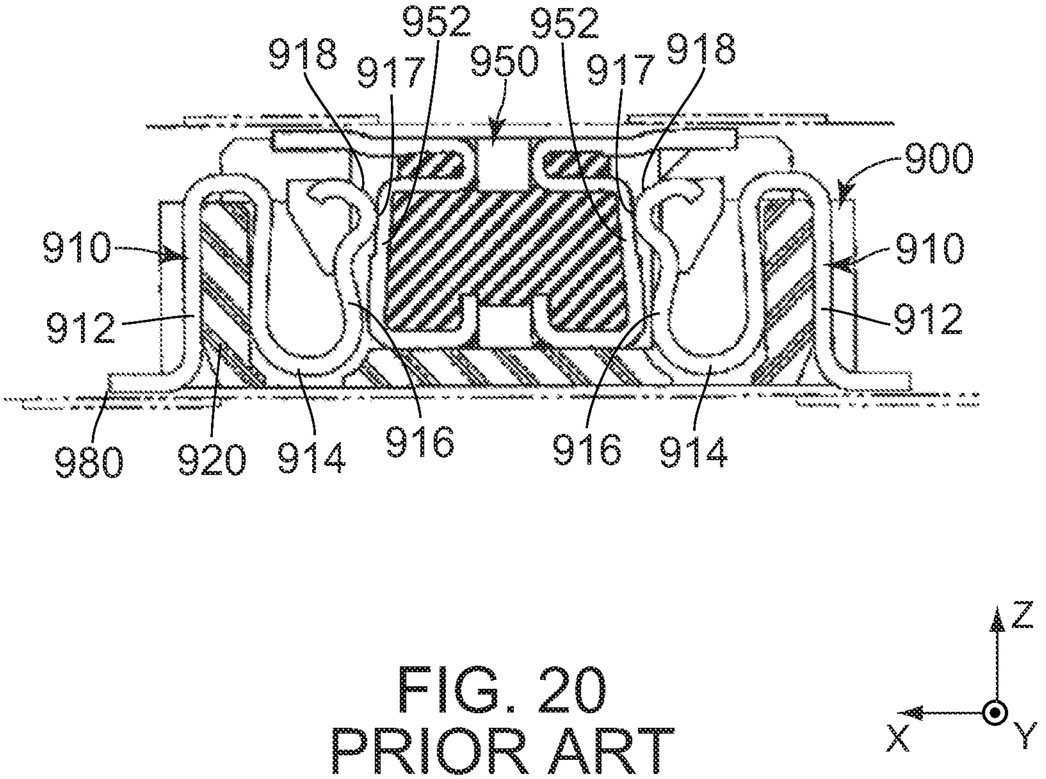
FIG. 20 PRIOR ART
FIG. 20 is a cross-sectional view showing the connector and the mating connector of FIG. 19. In the figure, the connector and the mating connector are in a mated state.

As shown in FIG. 14, the held portion 210 of the present embodiment extends in the up-down direction. As shown in FIG. 2, the held portion 210 is held by the housing 400. Specifically, the held portion 210 is held by the holding portion 414. In detail, the held portion 210 is press-fit into the holding portion 414.

As shown in FIG. 14, the supporting portion 260 of the present embodiment has a resilient property. The supporting portion 260 extends upward in the up-down direction from the coupling portion 220. Specifically, the supporting portion 260 extends upward and in a second orientation from the coupling portion 220 and is then bent to extend upward and in a first orientation. In the present embodiment, the first orientation is inward in the first horizontal direction while the second orientation is outward in the first horizontal direction. The first orientation is directed from the held portion 210 to the contact portion 270. Specifically, in the terminal 200 of the front row, the first orientation is rearward while the second orientation is forward. Additionally, in the terminal 200 of the rear row, the first orientation is forward while the second orientation is rearward.

As shown in FIG. 14, the coupling portion 220 of the present embodiment extends inward in the first horizontal direction from the held portion 210. The coupling portion 220 couples the held portion 210 and the supporting portion 260 with each other. The coupling portion 220 has a fulcrum 222.

Figure 12:
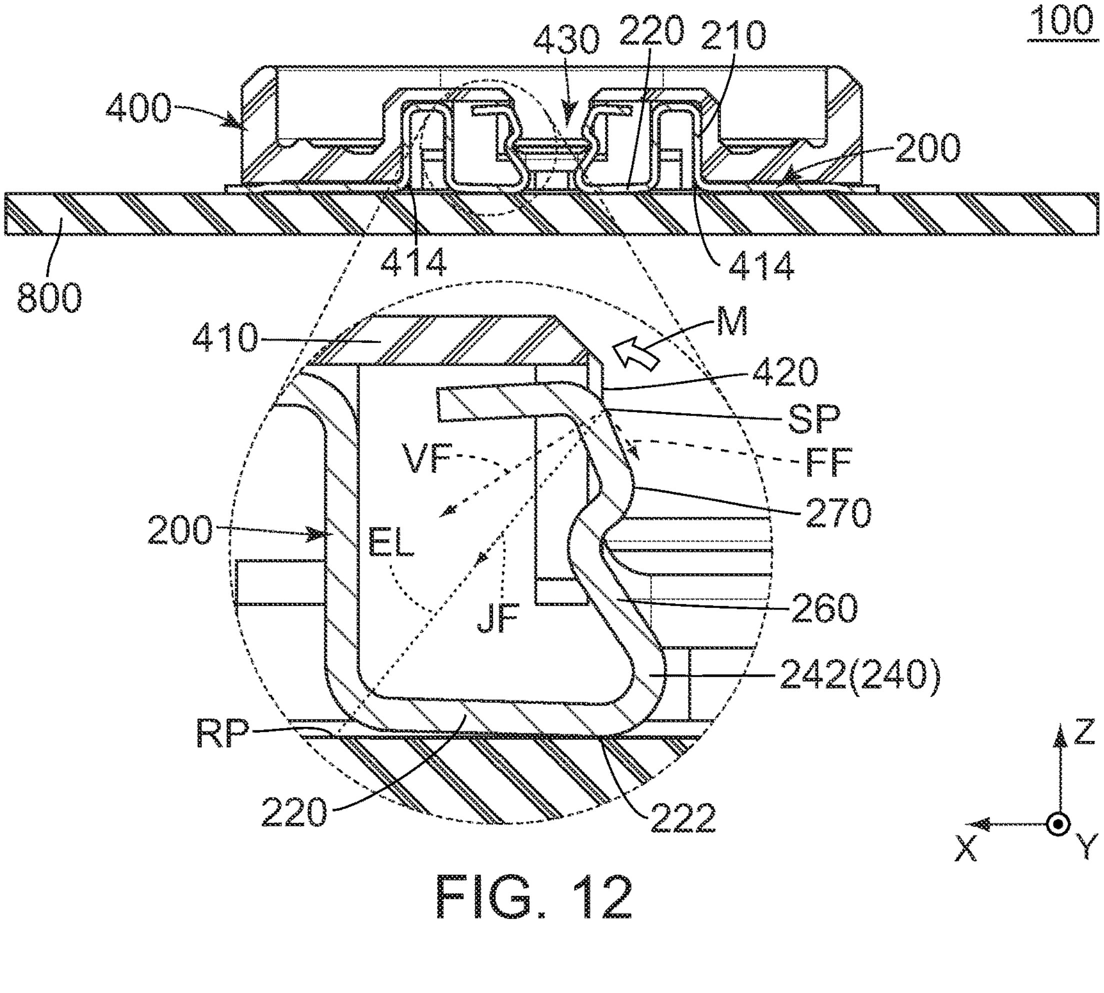
FIG. 12 is a cross-sectional view showing the connector which is included in the connector assembly of FIG. 5. In the figure, parts of a terminal and a housing are illustrated enlarged.

As shown in FIG. 14, in the up-down direction, the fulcrum 222 of the present embodiment protrudes downward and defines the downward-most position of the coupling portion 220. Referring to FIG. 12, the housing 400 has no bottom surface which is positioned just below the fulcrum 222. In other words, the fulcrum 222 is visible when the connector 100 is viewed from below in the up-down direction. This reduces a height of the connector 100 of the present embodiment in comparison with an assumption where the housing 400 have a bottom surface which is positioned just below the fulcrum 222.

Figure 6:
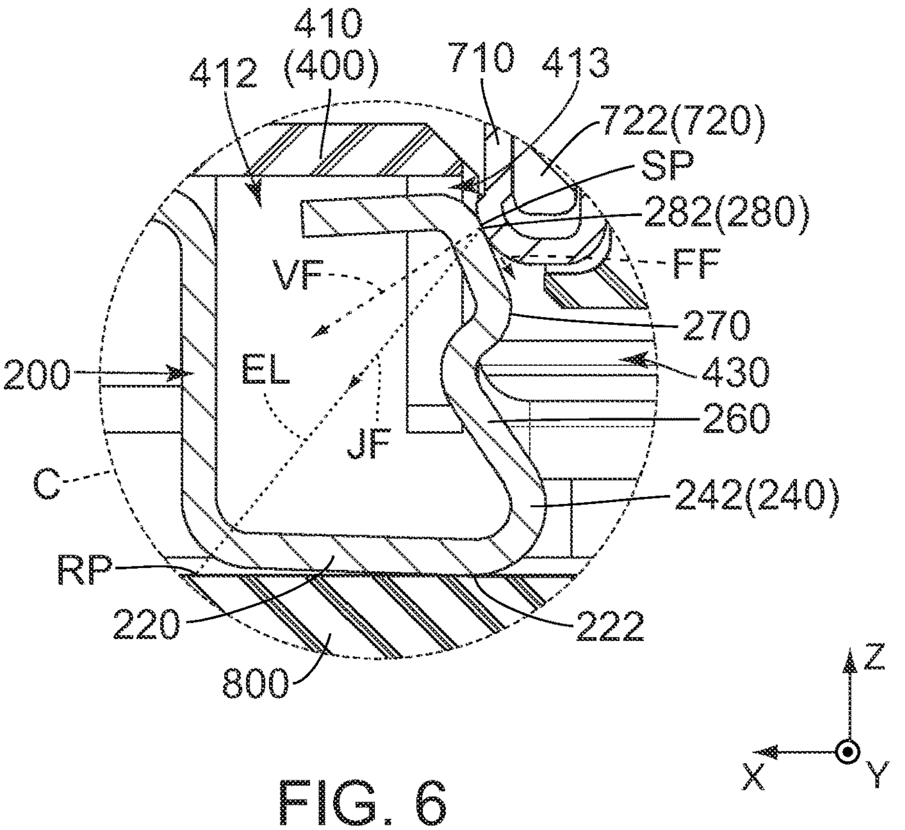
FIG. 6 is an enlarged view showing a part which is enclosed by dotted line C of FIG. 5.
Figure 7:
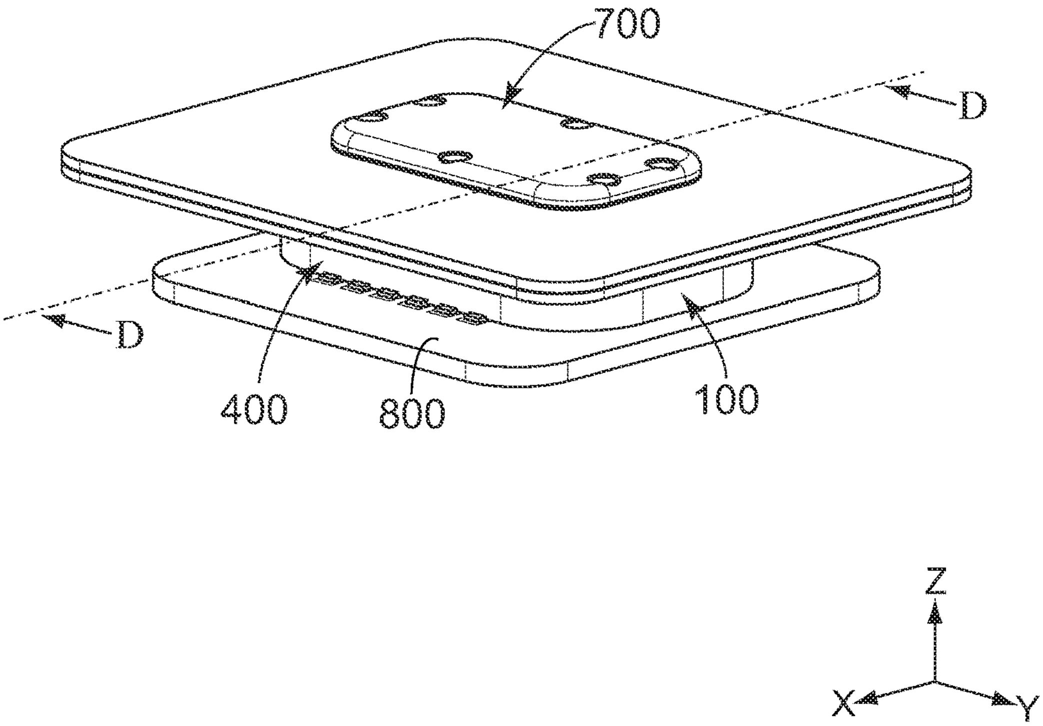
FIG. 7 is another perspective view showing the connector assembly of FIG. 1. In the figure, the connector and the mating connector is in a mated state where the connector and the mating connector are mated with each other.

Referring to FIG. 2, the fulcrum 222 is movable downward in the up-down direction. The fulcrum 222 is positioned beyond any of the connection guiding surfaces 420 in the first orientation of the first horizontal direction under an unmated state where the connector 100 and the mating connector 700 are not mated with each other. The fulcrum 222 is not in contact with the circuit board 800 under the unmated state where the connector 100, which is mounted on the circuit board 800, is not mated with the mating connector 700. As shown in FIG. 6, the fulcrum 222 is brought into contact with the circuit board 800 when the connector 100 mounted on the circuit board 800 is mated with the mating connector 700.

As shown in FIG. 14, the contact portion 270 of the present embodiment is positioned at an upper end of the supporting portion 260. The contact portion 270 is supported by the supporting portion 260. The contact portion 270 faces in the first orientation of the first horizontal direction perpendicular to the up-down direction, wherein the first orientation starting from the contact portion 270 is away from the held portion 210. Specifically, the orientation, in which the contact portion 270 in an initial state should be moved, is the second orientation which is opposite to the first orientation. As shown in FIG. 2, the contact portion 270 is positioned beyond any of the connection guiding surfaces 420 in the first orientation under the unmated state where the connector 100 and the mating connector 700 are not mated with each other.

As shown in FIG. 14, the guiding portion 280 of the present embodiment is positioned above the contact portion 270 in the up-down direction. The guiding portion 280 extends in the second orientation of the first horizontal direction and upward in the up-down direction, wherein the second orientation is opposite to the first orientation. As shown in FIG. 10, the two connection guiding surfaces 420 are positioned at opposite outsides, respectively, of the guiding portion 280 in the second horizontal direction which is perpendicular to both the up-down direction and the first horizontal direction. The guiding portion 280 has a curved surface 282.

As shown in FIG. 14, the curved surface 282 of the present embodiment has an R-shape which is bulged upward and inward in the first horizontal direction. As shown in FIG. 2, the curved surface 282 is positioned at a location same as a location of the connection guiding surface 420 in the first horizontal direction.

As shown in FIG. 14, the fixed portion 205 of the present embodiment defines an outer end of the terminal 200 in the first horizontal direction. The fixed portion 205 defines a lower end of the terminal 200 in the up-down direction. As shown in FIG. 11, the fixed portion 205 is fixed on a pad 810 of the circuit board 800.

As shown in FIG. 14, the terminal 200 further has a protruding portion 242. The protruding portion 242 is formed on a boundary portion 240 between the coupling portion 220 and the supporting portion 260. The protruding portion 242 is positioned beyond the contact portion 270 in the first orientation of the first horizontal direction. The fulcrum 222 is positioned beyond the protruding portion 242 in the second orientation of the first horizontal direction. The fulcrum 222 is positioned in the vicinity of the protruding portion 242.

As shown in FIG. 2, the protruding portion 242 is bulged in the first orientation under the unmated state where the connector 100 and the mating connector 700 are not mated with each other. The protruding portion 242 is positioned beyond any of the connection guiding surfaces 420 in the first orientation under the unmated state where the connector 100 and the mating connector 700 are not mated with each other.

Hereinafter, a detailed description will be made about a force applied to the terminal 200 upon the mating of the connector 100, which is mounted on the circuit board 800, with the mating connector 700, and a moment produced on the terminal 200 upon their mating.

First, the connector 100 and the mating connector 700 are arranged as shown in FIG. 2. In this state, the mating connector 700 is moved so that the connector 100 and the mating connector 700 approach each other in the up-down direction. Then, the mating terminal 710 is brought into contact with the guiding portion 280 of the terminal 200, and the mating of the connector 100 with the mating connector 700 begins.

Figure 5:
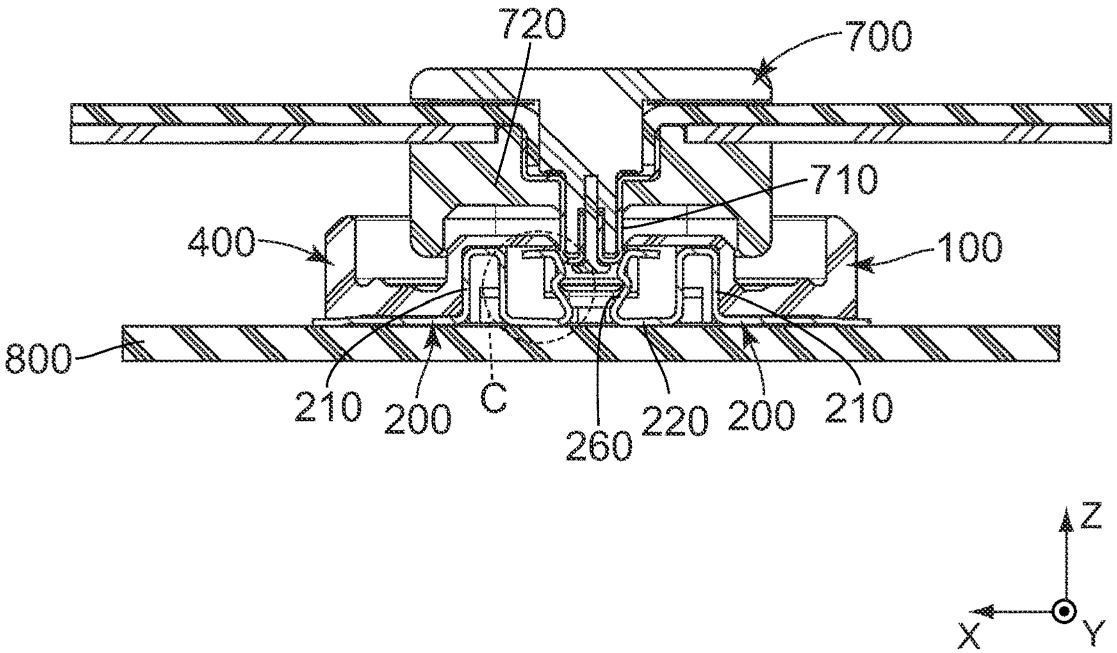
FIG. 5 is a cross-sectional view showing the connector assembly of FIG. 4.

In this state, the mating connector 700 is further moved so that the connector 100, and the mating connector 700 further approach each other in the up-down direction. Then, the mating terminal 710 is moved on the guiding portion 280 while the mating terminal 710 pushes down the whole of the terminal 200, and the fulcrum 222 begins to be pressed against the circuit board 800. Thus, the connector 100 and the mating connector 700 result in a specific contact state shown in each of FIGS. 5 and 6.

Under the specific contact state, the mating terminal 710 and the guiding portion 280 are in contact with each other at a specific contact location SP. At this time, the curved surface 282 of the guiding portion 280 of the terminal 200 is positioned at the specific contact location SP.

The aforementioned process is summarized as follows: in the middle of the process of mating the mating connector 700 and the connector 100 with each other, the mating terminal 710 is moved on the guiding portion 280 while the mating terminal 710 pushes down the whole of the terminal 200, and the fulcrum 222 begins to be pressed against the circuit board 800; and the mating terminal 710 and the guiding portion 280 are brought into contact with each other at the specific contact location SP at the beginning of the fulcrum 222 being pressed against the circuit board 800.

Under the specific contact state, the guiding portion 280 receives, from the mating terminal 710, a vertical force which is directed perpendicular to a contact surface where the mating terminal 710 and the guiding portion 280 are in contact with each other. The vertical force is referred to as a vertical force VF. In other words, at the specific contact location SP, the guiding portion 280 receives, from the mating terminal 710, the vertical force VF which is directed perpendicular to the contact surface where the mating terminal 710 and the guiding portion 280 are in contact with each other.

Under the specific contact state, the guiding portion 280 receives a frictional force caused by friction between the mating terminal 710 and the guiding portion 280. The frictional force is referred to as a frictional force FF. In other words, the guiding portion 280 receives, at the specific contact location SP, the frictional force FF caused by friction between the mating terminal 710 and the guiding portion 280 upon the movement of the mating terminal 710 on the guiding portion 280.

Summarizing the above, the guiding portion 280 receives a combined force JF of the vertical force VF and the frictional force FF under the specific contact state. An action line EL of the combined force JF intersects with the circuit board 800 at a reference point RP.

Under the specific contact state, the fulcrum 222 is positioned beyond the reference point RP in the first orientation of the first horizontal direction. More specifically, under the specific contact state, the fulcrum 222 is positioned at a location same as the specific contact location SP in the first horizontal direction or beyond the specific contact location SP in the first orientation of the first horizontal direction.

As described above, under the specific contact state, the guiding portion 280 receives the combined force JF while the fulcrum 222 is positioned beyond the reference point RP in the first orientation. Accordingly, referring to FIG. 12, a moment M with respect to the fulcrum 222, which moves the guiding portion 280 in the second orientation, is produced at the specific contact location SP. In other words, the connector 100 of the present embodiment is configured so that the moment M with respect to the fulcrum 222 at the specific contact location SP is directed in the second orientation.

As described above, the orientation, in which the contact portion 270 in the initial state should be moved, is the second orientation, and the moment M with respect to the fulcrum 222, which moves the guiding portion 280 in the second orientation, is produced at the specific contact location SP. Accordingly, the connector 100 of the present embodiment is configured so that the orientation, in which the contact portion 270 in the initial state should be moved, coincides with the orientation of the moment M with respect to the fulcrum 222 at the specific contact location SP. Thus, dissimilar to the connector 900 of Patent Document 1, the connector 100 of the present embodiment prevents an increase of a contact pressure between the mating terminal 710 and the terminal 200 upon the mating of the connector 100 with the mating connector 700. Consequently, the connector 100 of the present embodiment prevents buckling of the terminal 200 upon the mating of the connector 100 with the mating connector 700.

Although the specific explanation about the present invention is made above referring to the embodiments, the present invention is not limited thereto and is susceptible to various modifications and alternative forms.

Although the housing 400 of the connector 100 of the aforementioned embodiment has no bottom surface which is positioned just below the fulcrum 222 of the terminal 200, the present invention is not limited thereto. Specifically, the connector 100 may be modified so that a housing 400 has a bottom surface which is positioned just below the fulcrum 222 of the terminal 200. In the connector 100 of the present modification, the fulcrum 222 of the terminal 200 is brought into contact with the bottom surface of the housing 400 of the modified connector 100 when the modified connector 100 mounted on the circuit board 800 is mated with the mating connector 700. Specifically, in a middle of a process of mating the mating connector 700 and the modified connector 100 with each other, the mating terminal 710 is moved on the guiding portion 280 while the mating terminal 710 pushes down the whole of the terminal 200, and the fulcrum 222 begins to be pressed against the housing 400. Thus, a specific contact location SP of the present modification is a location at which the mating terminal 710, and the guiding portion 280 are brought into contact with each other at the beginning of the fulcrum 222 being pressed against the housing 400. In addition, a reference point RP of the present modification is a point at which an action line EL of a combined force JF intersects with the housing 400. On another note, the connector 100 of the present modification should be configured so that the fulcrum 222 is positioned beyond the reference point RP in the first orientation of the first horizontal direction. This enables the connector 100 of the present modification to be configured so that the orientation, in which the contact portion 270 in the initial state should be moved, coincides with an orientation of a moment M with respect to the fulcrum 222 at the specific contact location SP similar to the present embodiment. Thus, upon the mating of the modified connector 100 with the mating connector 700, the connector 100 of the present modification prevents an increase of a contact pressure between the mating terminal 710 and the terminal 200 and thereby can prevent buckling of the terminal 200.

In the aforementioned embodiment, the fulcrum 222 is positioned beyond the connection guiding surface 420 in the first orientation of the first horizontal direction under the unmated state where the connector 100 and the mating connector 700 are not mated with each other. However, the present invention is not limited thereto. Specifically, the fulcrum 222 may be positioned at a location same as a location of the connection guiding surface 420 in the first horizontal direction under the unmated state where the connector 100 and the mating connector 700 are not mated with each other. In other words, the connector 100 should be configured so that, under the unmated state where the connector 100 and the mating connector 700 are not mated with each other, the fulcrum 222 is positioned at the location same as the location of the connection guiding surface 420 in the first horizontal direction or beyond the connection guiding surface 420 in the first orientation of the first horizontal direction. This enables the fulcrum 222 to be brought into contact with the circuit board 800 at a relatively earlier point in the middle of the process of mating the connector 100 and the mating connector 700 with each other so that a desired moment M is produced at the specific contact location SP of the terminal 200. Thus, the connector 100 can reliably prevent buckling of the terminal 200 upon the mating of the connector 100 with the mating connector 700. The same effect is also achieved in the aforementioned modification.

In the aforementioned embodiment, the protruding portion 242 is bulged in the first orientation under the unmated state where the connector 100 and the mating connector 700 are not mated with each other. However, the present invention is not limited thereto. Specifically, the protruding portion 242 may protrude in the first orientation under the unmated state where the connector 100 and the mating connector 700 are not mated with each other. In other words, the protruding portion 242 should be configured so that, under the unmated state where the connector 100 and the mating connector 700 are not mated with each other, the protruding portion 242 protrudes in the first orientation or is bulged in the first orientation. This facilitates the supporting portion 260 of the terminal 200, which is pushed down by the mating terminal 710, to be tilted in the second orientation upon the mating of the connector 100 with the mating connector 700. Thus, the connector 100 can further prevent buckling of the terminal 200 upon the mating of the connector 100 with the mating connector 700. The same effect is also achieved in the aforementioned modification.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A connector which is mounted on a circuit board when used, wherein:

the connector is mateable along an up-down direction with a mating connector which has a mating terminal;

the connector has a housing and a terminal;

the terminal has a held portion, a supporting portion, a coupling portion, a contact portion and a guiding portion;

the held portion is held by the housing;

the supporting portion has a resilient property;

the coupling portion couples the held portion and the supporting portion with each other;

the coupling portion has a fulcrum;

the contact portion is supported by the supporting portion and faces in a first orientation of a first horizontal direction which is perpendicular to the up-down direction;

the first orientation starting from the contact portion is away from the held portion;

the guiding portion is positioned above the contact portion in the up-down direction;

the guiding portion extends in a second orientation of the first horizontal direction and upward in the up-down direction;

the second orientation is opposite to the first orientation;

in a middle of a process of mating the mating connector and the connector with each other, the mating terminal is moved on the guiding portion while the mating terminal pushes down a whole of the terminal and the fulcrum begins to be pressed against one of the circuit board and the housing;

the mating terminal and the guiding portion are brought into contact with each other at a specific contact location at the beginning of the fulcrum being pressed against the one of the circuit board and the housing;

the guiding portion receives a vertical force from the mating terminal at the specific contact location;

the vertical force is directed perpendicular to a contact surface where the mating terminal and the guiding portion are in contact with each other at the specific contact location;

the guiding portion receives, at the specific contact location, a frictional force caused by friction between the mating terminal and the guiding portion upon movement of the mating terminal on the guiding portion;

an action line of a combined force of the vertical force and the frictional force intersects with the one of the circuit board and the housing at a reference point; and the fulcrum is positioned beyond the reference point in the first orientation of the first horizontal direction.

2. The connector as recited in claim 1, wherein, in the first horizontal direction, the fulcrum is positioned at a location same as the specific contact location or beyond the specific contact location in the first orientation.

3. The connector as recited in claim 1, wherein:

the guiding portion has a curved surface; and the curved surface is positioned at the specific contact location.

4. The connector as recited in claim 1, wherein:

the housing has two connection guiding surfaces;

the two connection guiding surfaces are positioned at opposite sides, respectively, of the guiding portion in a second horizontal direction perpendicular to both the up-down direction and the first horizontal direction;

each of the connection guiding surfaces extends in a plane which is defined by the up-down direction and the second horizontal direction;

the terminal further has a protruding portion;

the terminal has a boundary portion between the coupling portion and the supporting portion;

the protruding portion is formed on the boundary portion;

under an unmated state where the connector and the mating connector are not mated with each other, the protruding portion protrudes in the first orientation or is bulged in the first orientation; and under the unmated state, each of the contact portion and the protruding portion is positioned beyond any of the connection guiding surfaces in the first orientation.

5. The connector as recited in claim 4, wherein:

the guiding portion has a curved surface; and the curved surface is positioned at a location same as a location of the connection guiding surface in the first horizontal direction.

6. The connector as recited in claim 4, wherein the protruding portion is positioned beyond the contact portion in the first orientation of the first horizontal direction.

7. The connector as recited in claim 4, wherein:

the fulcrum is positioned in the vicinity of the protruding portion;

in the up-down direction, the fulcrum protrudes downward and defines a downward-most position of the coupling portion; and under the unmated state, the fulcrum is positioned at a location same as a location of the connection guiding surface in the first horizontal direction or beyond the connection guiding surface in the first orientation of the first horizontal direction.

8. The connector as recited in claim 7, wherein the fulcrum is visible when the connector is viewed from below in the up-down direction.

* * * * *